Patented Nov. 23, 1948

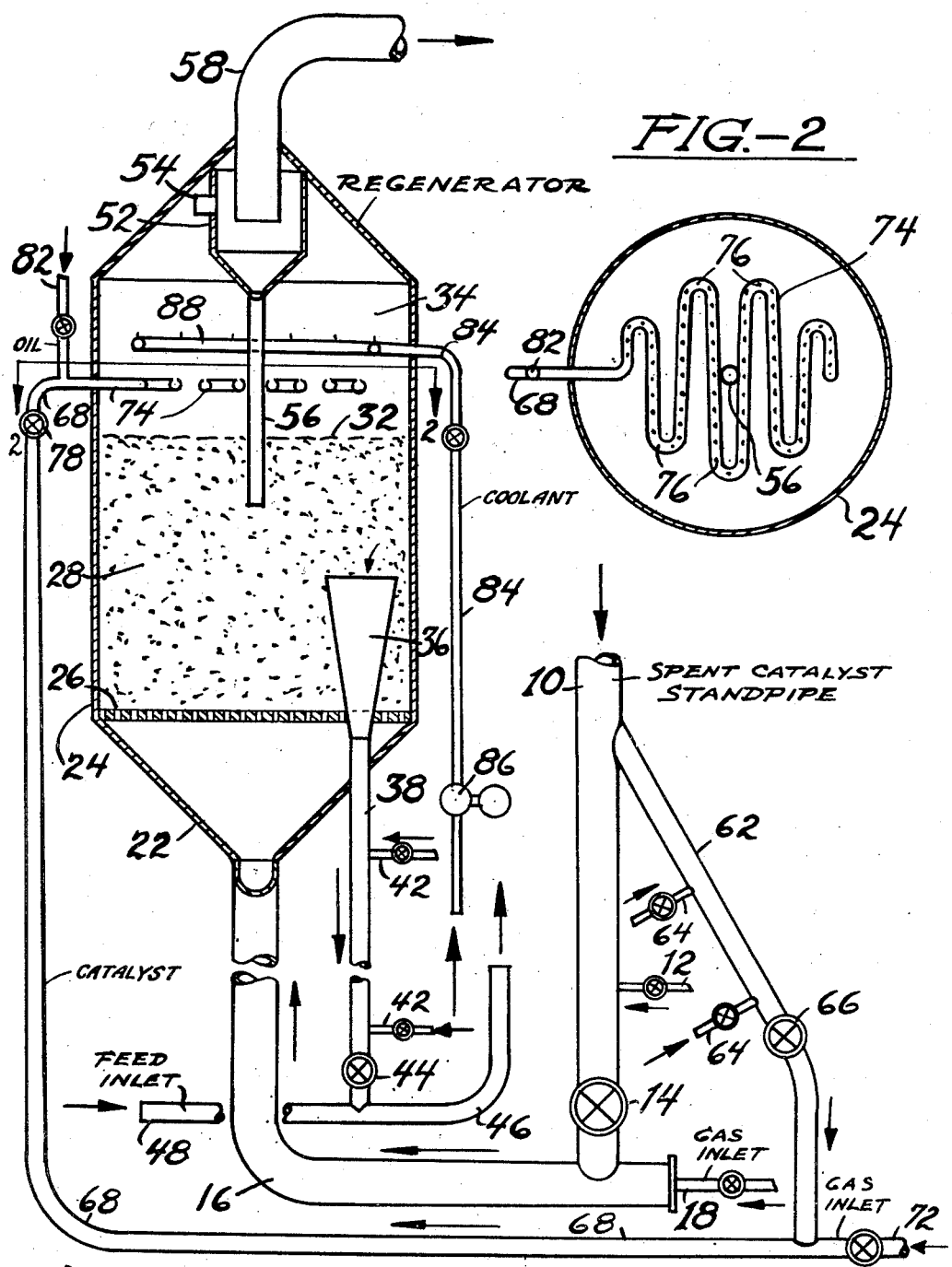

2,454,373

UNITED STATES PATENT OFFICE 2,454,373

FLUIDIZED CATALYST REGENERATION PROCESS WHICH INCLUDES OVERHEAD COOLING

Forrest H. Blanding, Elizabeth, N. J., assignor to Standard Oil Development Company, a corporation of Delaware Application December 14, 1944, Serial No. 568,159

6 Claims. (Cl. 252—242)

This invention relates to the regeneration of solid particles by burning with air or other oxygen-containing gas, and more particularly, relates to the regeneration of spent or fouled catalyst particles in hydrocarbon conversion operations.

In catalytic organic reactions there are many reactions in which burnable deposits are laid down on the catalyst particles and the catalyst particles have to be regenerated before they are used again. In the catalytic conversion of hydrocarbons, coke or carbonaceous material is deposited on the catalyst particles and these deposits are usually removed by burning with air or other oxygen-containing gas. The burning is exothermic and must be controlled to avoid overheating of the catalyst.

In catalytic conversion processes using powdered catalyst or finely divided catalyst, the divided catalyst is circulated from the reaction zone to the regeneration zone to regenerate the catalyst, and the regenerated catalyst is then returned to the reaction zone. In the regeneration of the spent catalyst, the spent catalyst is mixed with air and the coke or carbonaceous material is burned off. When using powdered catalyst, the catalyst particles are maintained as a fluidized turbulent bed in the regeneration zone having a dense lower phase and a dilute upper phase. The velocity of the air passing through the regeneration zone is selected to maintain the bed in fluidized condition during the regeneration. The regeneration gases pass overhead.

The gases leaving the regeneration zone contain, in addition to completely inert gases, such as nitrogen and carbon dioxide, a high proportion (5–10%) of carbon monoxide and some unburned hydrocarbons along with about 3 to 4% of oxygen.

Because sufficient solids are present in the dense bed in the regeneration zone to absorb heat released by the regeneration, excess temperatures do not result from regeneration or combustion in the dense bed in the regeneration zone. However, the catalyst content of the gases in the dilute phase above the dense bed or mixture in the regeneration zone is very low and when burning of carbon monoxide and residual hydrocarbons in such regeneration gases continues in the dilute phase, excessively high temperatures (up to 1800° F. or higher) may be reached and these high temperatures deactivate the residual catalyst in the dilute phase and dangerously overheat the equipment.

Such burning in the dilute phase referred to as "after-burning" does not occur to any great extent if the dilute phase temperature is held below about 1075° F. or if the oxygen content of the regeneration gases is low, but if after-burning is once started, the burning continues due to the continuous supply of oxygen and combustible material and the higher reaction rate at the resulting increased temperature.

One method heretofore used for controlling after-burning is to inject water into the gases above the dense bed of catalyst in the regeneration zone in order to reduce the temperature of the regenerating gases to the point that after-burning will not readily occur. The injection of this water forms steam which has a serious disadvantage because it causes serious deactivation of the catalyst at the high temperatures present in the regeneration zone.

If the oxygen concentration of the regeneration gases leaving the dense bed or the regeneration zone is maintained below about 1.6%, after-burning can be eliminated or greatly minimized. It is ordinarily desirable to have about 3 to 4% of oxygen in the regeneration outlet gases to maintain a high burning rate in the regeneration zone in as much as the burning of the coke or carbonaceous material limits the through-put of most commercial fluid catalytic cracking units.

According to the preferred form of my invention, spent or fouled catalyst particles from the reaction zone and containing coke or carbonaceous material are sprayed into the regeneration gases containing only a small amount of suspended catalyst particles as, for example, in the dilute phase in the regeneration zone in operations where the regenerated catalyst particles are removed as a dense mixture from the dense bed or mixture in the regeneration zone.

The thus injected spent or fouled catalyst particles will reduce the temperature in the regeneration gases because of the high specific heat of the particles compared with that of the gas and because the temperature of the particles is about 75–150° F. lower than the regeneration temperature. Also, some of the spent catalyst particles will be at least partly regenerated in the dilute phase and this will reduce the oxygen concentration of the regeneration gas in the dilute phase. Sufficient spent catalyst is injected to reduce the oxygen concentration to below about 1.6% and this prevents after-burning.

In another form of my invention, a fine combustible oil spray is injected immediately above the dense bed or mixture in the regeneration zone. The oil is burned rapidly, consuming oxygen in the dilute phase in the regeneration zone and this reduces the concentration of oxygen in the dilute phase to below about 1.6%. The heat produced by the burning of the oil may be absorbed by injecting a small amount of water or other cooling medium to prevent a temperature rise in the regeneration gases. Only a small amount of water is injected as compared to the prior process using larger amounts of water and deactivation of catalyst by steam is lessened due to the lower temperature and smaller amount of steam.

Instead of injecting only oil into the regeneration gases in the dilute phase, I may inject a mixture of oil and spent catalyst, the burning of the oil and of the coke or carbonaceous material on the spent catalyst consuming excess oxygen and the spent catalyst particles absorbing the heat produced to prevent a temperature rise such as would favor after-burning.

My invention may be used in all cases of regeneration where after-burning may occur. For example, in the older type units where the regenerated catalyst and regeneration gases pass overhead from the regeneration zone or vessel and through a plurality of separating means in series, after-burning may occur after the first separating means after the catalyst content of the regeneration gases is markedly reduced. My invention may be used in such cases by introducing an oil spray into the regeneration gases which may be followed by the injection of a small amount of water or other cooling medium, by introducing spent catalyst particles into the regeneration gases or by introducing a mixture of spent catalyst and oil into the regeneration gases.

In the drawing:

Fig. 1 represents a vertical longitudinal cross-section of one form of apparatus adapted to carry out my process; and Fig. 2 represents a horizontal transverse cross-sectional view taken substantially on line 2—2 of Fig. 1.

Referring now to the drawing, the reference character 10 designates a portion of a spent catalyst standpipe in which the spent or fouled catalyst particles are maintained in a dry fluidized or liquid-like condition by the introduction of fluidizing gas by one or more lines 12. The spent or fouled catalyst particles have coke or carbonaceous material deposited thereon resulting from a hydrocarbon conversion operation. In improved units of this type the spent or fouled catalyst particles are withdrawn from a reaction zone or vessel in a dense phase or mixture and the fluidized particles in the standpipe produce a hydrostatic pressure at the base of the standpipe for passing the particles through the regeneration equipment presently to be described.

The spent or fouled catalyst or contact particles may be at a temperature of about 750° F. to 1050° F., depending on the type of hydrocarbon conversion being carried out in the reaction zone.

For the catalytic cracking of hydrocarbons, any suitable cracking catalyst may be used, such as acid-treated bentonite clays, synthetic silica alumina gels, synthetic silica magnesia gels, etc.

For reforming catalysts used in the reforming of naphthas, any suitable reforming catalyst may be used, such as group VI metals or cobalt, nickel, or iron supported on alumina or compounds of group VI oxides with nickel, cobalt or iron. The catalyst is preferably in powdered or finely divided form with about 95%–100% passing through 100 mesh and with about 0 to 30% of 0 to 20 microns. Coarser catalyst may be used if desired. In the catalytic cracking of hydrocarbons, about 2 parts of catalyst to one of oil to 40 parts of catalyst to one of oil by weight may be used, although for certain special operations more or less catalyst than the above may be used.

The spent catalyst standpipe 10 is provided with a control valve 14 at its bottom portion for controlling the rate of withdrawal of spent catalyst particles from the standpipe. The spent particles are introduced into line 16 where they are mixed with regenerating gas, such as air, introduced through line 18 and the less dense mixture or suspension is passed through line 16 into the conical bottom portion 22 of a regeneration zone or vessel 24 below a perforated distribution plate 26 arranged in the bottom portion of the regeneration vessel 24. The perforated plate 26 is used to evenly distribute the solid particles across the area of the regeneration zone.

The velocity of the regenerating gas is so selected that the catalyst particles undergoing regeneration are maintained as a fluidized turbulent liquid-simulating bed or mixture 28 having a level indicated at 32. The fluidized solid particles form a relatively dense bed or phase and the space above the dense phase shown at 34 is the dilute phase in which there is only a small amount of catalyst particles suspended in the regeneration gases.

The velocity of the regenerating gas may vary between about 0.5 ft./second and 3 ft./second and under these conditions the density of the dense bed or mixture 28 is about 35 lbs./cu. ft. to 12 lbs./cu. ft. The density of the dilute less dense phase 34 is about .002 lb./cu. ft. to 0.02 lb./cu. ft.

Regenerated catalyst particles are withdrawn from the lower portion of the dense bed or mixture 28 through funnel shaped member 36 which extends above the distribution plate 26. From the funnel shaped member 36 the fluidized dense catalyst particles flow into standpipe 38 which is provided with fluidizing lines 42 for maintaining the regenerated catalyst particles in a fluidized condition in the standpipe 38. Standpipe 38 is provided with a control valve 44 for controlling the rate of withdrawal of regenerated catalyst particles from the regeneration zone or vessel 24.

The regenerated catalyst particles are introduced into line 46 where they are mixed with reactants introduced through line 48 and the mixture is passed to a reaction zone or vessel (not shown) for carrying out the desired reaction. Spent or fouled catalyst particles are withdrawn from the reaction zone and passed into the spent catalyst standpipe 10 above described. In the catalytic conversion of hydrocarbons, the reactant feed may comprise hydrocarbon vapors or liquid with the regenerated catalyst particles in either case supplying at least part of the heat of conversion.

The regeneration gases leaving the dense bed or mixture 28 pass into the upper portion of the regeneration zone or vessel comprising the less dense or dilute phase 34. As these regeneration gases still contain entrained catalyst particles, they are passed through a separating means 52 having an inlet 54, for separating most of the entrained solid particles from the regeneration gases. The separating means 52 is arranged in the upper portion of the regeneration zone or vessel 24.

The separating means is shown as a cyclone separator but other forms of separating means may be used. The separated regenerated catalyst particles are returned to the dense bed or mixture 28 in the regeneration zone or vessel 24 by return pipe 56 which extends to a point below the level 32 in the regeneration vessel.

The regeneration gases leave the regeneration vessel 24 through line 58 and as these regeneration gases still contain entrained catalyst particles, the gases are preferably passed through another separation step before being vented to the atmosphere. Such an additional separation step may be effected by passing the gases through an electrostatic precipitator or other separating equipment for removing substantially all of the entrained catalyst particles. The regeneration gases are then passed to the atmosphere.

As the regeneration gases are at a relatively high temperature, they are preferably passed through a heat exchanger (not shown) such as a waste heat boiler for recovering some of the heat from the gases and for cooling the regeneration gases to about 300° F. to 450° F. before passing them through the electrostatic precipitator.

In the regeneration vessel 24 the regeneration gases in the dilute phase 34 contain carbon dioxide, carbon monoxide and oxygen. While the burning of the coke or carbonaceous material is taking place in the dense bed or mixture 28, the heat is taken up by the catalyst particles and the hot catalyst particles are used for supplying heat of reaction in the reaction vessel or both heat of reaction and heat of vaporization for the reactant. However, in the dilute phase 34 there is only a small amount of catalyst particles present and carbon monoxide in the presence of oxygen burns rapidly if the temperature becomes too high, forming carbon dioxide with the evolution of heat.

In the regeneration of a cracking catalyst, the temperature in the dense phase may rise as high as about 1150° F. The temperature in the dilute phase should not be allowed to rise any further than about 1150° F. and preferably should be lower in order to minimize the combustion of the carbon monoxide.

In order to reduce the temperature of the regeneration gases in the dilute phase 34, spent catalyst particles are introduced into the dilute phase. The spent catalyst particles are preferably withdrawn from spent catalyst standpipe 10 through branch standpipe 62 provided with fluidizing lines 64 and a control valve 66.

The spent catalyst particles at a temperature of about 750° F. to 1050° F. are introduced into line 68 where they are mixed with a suspending gas, such as steam, flue gas, etc., introduced through valved line 72 and this mixture or suspension of spent catalyst particles is introduced into the dilute phase 34 in the regeneration vessel 24 by means of a perforated header 74 with the perforations 76 arranged in the upper part thereof. Fig. 2 shows the conformation of the distributing head.

Other forms of distributing head may be used to substantially uniformly introduce the spent catalyst particles across the area of the upper portion of the regeneration vessel 24. A sufficient amount of spent catalyst particles is introduced to reduce the temperature of the dilute phase to about 950° F. to 1100° F. The spent catalyst particles are at a lower temperature than the temperature of the dilute phase and they absorb heat by being heated to the temperature in the dilute phase.

Also some of the coke or carbonaceous material on the spent catalyst particles will be burned and this reduces the oxygen concentration in the dilute phase. A sufficient amount of spent catalyst particles is preferably introduced to reduce the oxygen concentration in the dilute phase to below about 1.6%. While some heat may be liberated by burning the coke on the introduced spent catalyst, the total effect is cooling where the temperature of the introduced spent catalyst is at least 100° F. lower than the regeneration temperature. By cooling the spent catalyst before introducing it into the regenerator, smaller amounts of spent catalyst may be used.

In another form of my invention the line 68 used for conducting the spent catalyst to the dilute phase is closed off by shutting valve 78 in line 68 and the valve 66 in branch standpipe 62 and the valve in the gas inlet line 72. Instead of adding spent catalyst particles to the dilute phase, a combustible oil, such as residual oil, kerosene, etc., may be introduced through valved line 82 into line 68 for introduction into the perforated header 74. The oil is sprayed into the dilute phase and burns rapidly to decrease the oxygen concentration in the dilute phase.

The burning of the oil will result in a small rise in temperature in the dilute phase and if desired, a small amount of water or other cooling medium may be introduced into the dilute phase above the distributing head 74 to prevent this temperature rise. This water or other cooling medium is introduced through line 84 and pumped through this line by pump 86 to a perforated distributing ring 88 arranged above the distributing head 74 in the dilute phase 34 in the regeneration vessel 24. Other forms of distributing rings or members may be used.

The temperature rise due to the burning of the oil is much less than would be the case if after-burning were taking place in the dilute phase 34. Sufficient water or other cooling medium is introduced into the dilute phase to reduce the temperature by about 25–150° F.

As another form of my invention, I may introduce a mixture of oil and spent catalyst particles into the dilute phase 34 in the regeneration vessel 24. The combustible oil, such as residual oil, kerosene, gas oil, torch oil, etc., is passed through valved line 82 and may be mixed with the spent catalyst particles passing through line 68 for introduction into the distributing head 74 above described. When using a mixture of oil and spent catalyst particles, water or other cooling medium may be introduced through the distributing ring 88 arranged above the distribution head 74 for reducing the temperature of the regeneration gases in the dilute phase below the critical temperature at which after-burning continues at an accelerating rate. By selection of a suitable quantity of spent catalyst, however, such additional cooling agents would be unnecessary.

The spent catalyst may be introduced intermittently or continuously in the dilute phase. Instead of introducing the spent catalyst at a temperature of about 800° F. to 1000° F. or about the temperature at which it is commonly removed from the reaction vessel, the spent or contaminated catalyst particles may be further cooled to reduce their temperature to about 300° F. to 800° F. before introducing them into the dilute phase 34 in the regeneration zone or vessel 24.

By introducing the spent catalyst particles into the dilute phase 34, the concentration of solid particles in the regeneration gases is increased somewhat, but practically all of these catalyst particles settle out in the settling space or the dilute phase 34, and most of the rest of the catalyst particles would be removed by the separating means 52.

If for some reason there is uncontrolled afterburning and the temperature in the dilute phase 34 rises above about 1150° F., emergency water sprays may be used or the distributing ring 88 may be used for injecting water into the dilute phase 34. When the temperature in the dilute phase is lowered to about 1050° F., the emergency water sprays may be shut off.

The spent catalyst particles should be well distributed across the cross-section of the dilute phase 34 in the regeneration zone or vessel 24. The high concentration of coke or carbonaceous material on these catalyst particles at the point where the oxygen concentration is much lower than that in the dense bed or mixture 28 increases regenerator carbon burning capacity slightly or to some extent in addition to controlling afterburning.

Instead of using one spray or distribution head, two or more such distribution heads may be used at different levels, especially when there may be operations in which the level of the dense phase in the regeneration zone is varied.

During regeneration of the cracking catalyst in the dense bed or mixture 28 in the regeneration zone or vessel 24, the temperature in this zone may vary between about 950° F. and 1150° F., preferably about 1050° F.

The following example sets forth calculated values for the amounts of spent catalyst to be used to prevent or minimize after-burning:

| | | | |
|---|---|---|---|
| Regenerator diameter_____ft __ | | | 35 |
| Velocity of gas in regenerator ft./sec __ | | | 1.5 |
| Regeneration temperature__°F__ | | | 1050 |
| Oxygen concentration in regeneration gases from dense bed of regenerator__percent by vol__ | | | 1.5 |
| Final oxygen concentration desired_____percent by vol __ | | | 1.5 |
| Spent catalyst temperature__°F__ | 300 | 850 | 950 |
| Pounds of catalyst required per second to maintain temperature of 1050° F.[1]_____ | 27 | 100 | 200 |
| Pounds of catalyst required per second to reduce temperature to about 950° F.[1]_____ | 33 | 123 | -- |

[1] Takes into account heat of combustion. If contact time and distribution is insufficient for this specified amount of combustion, that is, if burning is incomplete, then the temperature will be lowered considerably more than that specified.

While several forms of my invention have been shown and conditions of operation have been included, it is to be understood that these are by way of illustration only and various changes and modifications may be made without departing from the spirit of my invention.

I claim:

1. In a process for regenerating finely divided catalytic material containing combustible deposits wherein one stream of spent catalytic material containing combustible deposits resulting from a conversion treatment is discharged into a lower portion of an enlarged regeneration vessel through which an oxidizing gas is passed upwardly at a velocity controlled to maintain a relatively dense phase layer of catalyst undergoing regeneration in the bottom portion of the regeneration vessel, a stream of regenerated catalyst is separately withdrawn from the lower portion of said regeneration vessel at a rate adjusted to maintain the upper level of said dense phase layer at a substantial distance below the top of said vessel to form a disengaging space in the top portion of said regeneration vessel containing a relatively dilute phase of spent regeneration gas and entrained catalytic material and wherein the spent regeneration gas passing from the upper level of said dense phase into said dilute phase contains between about 3% and 4% free oxygen and a relatively high concentration of carbon monoxide; the method of preventing secondary combustion of said carbon monoxide by said excess oxygen in said dilute phase which comprises dispersing a second stream of unregenerated spent catalytic material from said conversion treatment free of uncombined oxygen into said dilute phase to reduce the free oxygen contained in said spent regeneration gas below about 1.6% by burning combustible deposits from said second stream of spent catalyst.

2. The process defined in claim 1 wherein said second stream of spent catalyst is first intermixed with an inert gas free of uncombined oxygen and the resulting suspension is dispersed in said dilute phase.

3. In the process defined by claim 2, the further improvement which comprises intermixing the first-mentioned stream of spent catalyst from the conversion treatment with air and passing the resulting mixture into the bottom portion of the regenerating zone.

4. In a process for regenerating finely divided catalytic material containing combustible deposits wherein one stream of spent catalytic material containing combustible deposits resulting from a conversion treatment is discharged into the lower portion of an enlarged regeneration zone through which air is passed upwardly at a velocity controlled to maintain a relatively dense phase layer of catalyst undergoing regeneration in the lower portion of said regeneration zone, a stream of regenerated catalyst is separately withdrawn from the lower portion of said regeneration zone at a rate adjusted to maintain the upper level of said dense phase layer at a substantial distance below the top of said zone to form a disengaging space in the top portion of said regeneration zone containing a relatively dilute phase of spent regeneration gas and entrained catalytic material and wherein the spent regeneration gas passing from the upper level of said dense phase into said dilute phase contains more than about 3% free oxygen but less than that normally present in air and a relatively high concentration of carbon monoxide, the method of preventing secondary combustion of said carbon monoxide by said excess oxygen in said dilute phase which comprises dispersing a second stream of unregenerated spent catalytic material from said conversion treatment free of uncombined oxygen into said dilute phase to reduce the free oxygen contained in said spent regeneration gas below about 1.6% by burning combustible deposits from the spent catalyst in said second stream of spent catalytic material.

5. The process defined in claim 4 wherein said second stream of spent catalyst is first intermixed with an inert gas free of uncombined oxygen and the resulting suspension is dispersed in said dilute phase.

6. In the process defined by claim 4 wherein the amount of unconsumed oxygen in the spent regeneration gas leaving the upper level of the dense phase layer is between about 3% and 4%.

FORREST H. BLANDING.

REFERENCES CITED

The following references are of record in the file of this patent:

UNITED STATES PATENTS

| Number | Name | Date |
|---|---|---|
| 2,273,076 | Voorhies | Feb. 17, 1942 |
| 2,358,039 | Thomas et al. | Sept. 12, 1944 |
| 2,367,281 | Johnson | Jan. 16, 1945 |
| 2,386,491 | McOmie | Oct. 9, 1945 |
| 2,393,839 | Thomas et al. | Jan. 29, 1946 |
| 2,409,751 | Gerhold et al. | Oct. 22, 1946 |
| 2,414,852 | Burnside et al. | Jan. 28, 1947 |
| 2,414,883 | Martin | Jan. 28, 1947 |